Jan. 31, 1928.
S. W. CRAWFORD
1,657,881
BEARING
Filed April 20, 1925
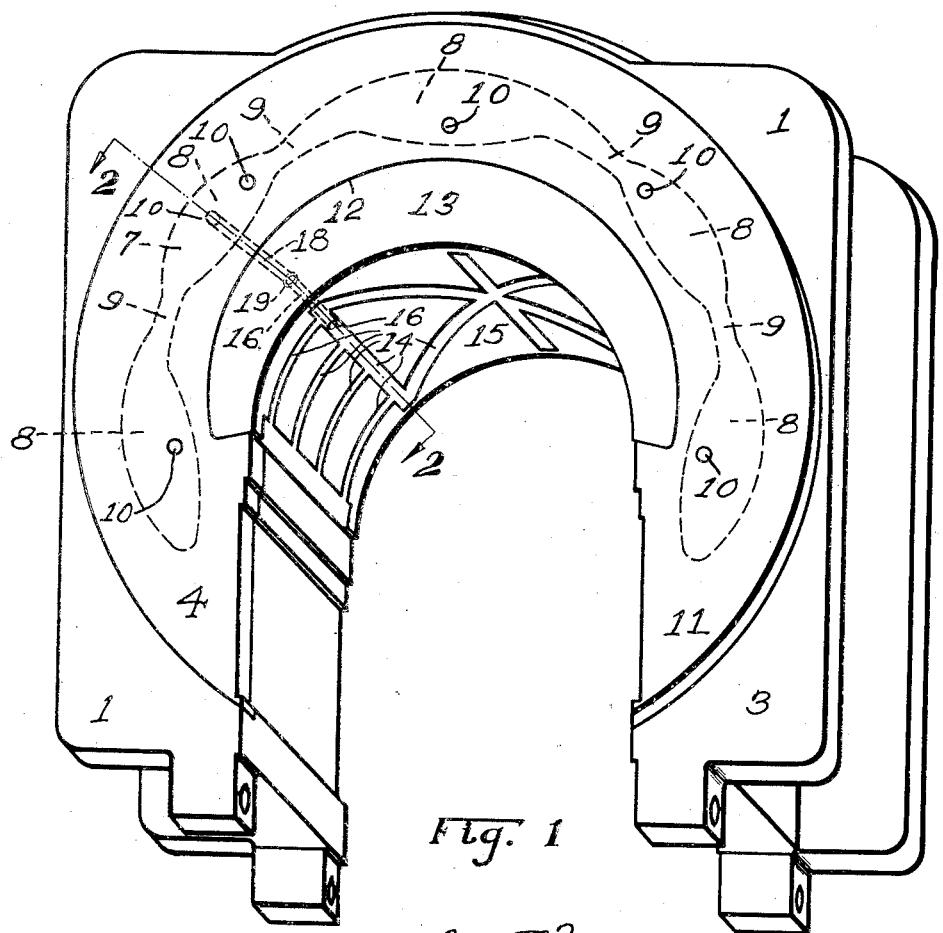
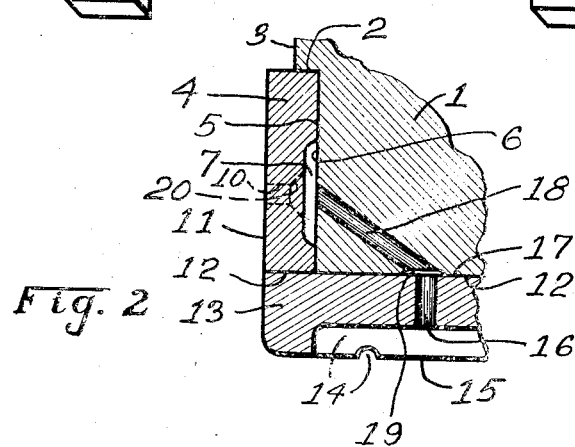
INVENTOR:
Samuel W. Crawford.
BY
Hugh K. Wagner,
ATTORNEY Patented Jan. 31, 1928.

1,657,881

UNITED STATES PATENT OFFICE.

SAMUEL W. CRAWFORD, OF UNIVERSITY CITY, MISSOURI, ASSIGNOR, BY MESNE ASSIGNMENTS, TO NATIONAL BEARING METALS CORPORATION, OF ST. LOUIS, MISSOURI, A CORPORATION OF NEW YORK.

BEARING.

Application filed April 20, 1925. Serial No. 24,565.

This invention relates generally to bearings, and more specifically to automatic means for lubricating the thrust face of locomotive driving boxes or similar heavy-duty bearings.

Hitherto the thrust or lateral face of a locomotive driving box and the lateral face of the wheel hub in contact therewith have been subject to excessive wear by reason of the inefficient methods employed to lubricate the same. In practice, the well lubricated crown bearings or journal linings of locomotive driving boxes, although supporting the weight of the heavy engine, are worn to only one-third of their permissible wear when the wear on the lateral faces of the box and hub has reached the point where the engine must be sent to the repair shop for replacement of the lateral plates of the boxes. The principal object of the present invention is to provide efficient means for lubricating the said lateral faces so that the wear on the same will be minimized to the extent at least that the faces need not be renewed until the crown bearings have served their useful life.

A further object is to provide such means for lubricating the lateral face of a driving box which automatically increases the flow of lubricant to the lateral face when the latter becomes hot, and decreases the flow when the box cools.

A further object is to provide features of construction which will simplify and facilitate the economical manufacture of the component parts of the box and the assembling of the same.

Other objects and advantages will appear in the course of the following description of the preferred embodiment of this invention.

In the accompanying drawings forming part of this specification, in which like numbers of reference denote like parts wherever they occur, Figure 1 is a perspective view exhibiting so much of a locomotive driving box as will suffice to show the connection of my invention therewith; and Figure 2 is a fragmentary sectional view taken on the line 2—2 in Figure 1.

The box proper 1 is ordinarily a steel casting of the usual type, recessed at 2, in its lateral face 3, to receive the lateral or thrust plate 4, which is secured thereto in any suitable manner, preferably by welding with Tobin bronze. The plate 4 may be of any conventional shape, but this invention modifies the plates hitherto used for this purpose in that its inner face 5, which meets the retracted face 6 of the box 1, is provided with a circumferentially extending recess 7, preferably comprising enlarged portions 8 connected by constricted necks 9. A series of ports 10 afford communication between the enlarged portions 8 of the recess 7 and the outer face 11 of the plate 4.

The box 1 and the plate 4 are provided with the usual recesses 12 for receiving the crown journal lining or bearing 13, which is conventionally of brass and secured to the plate 4, preferably also by welding with Tobin bronze. Crown lining 13 preferably contains the usual lubricant-distributing grooves 14 in its inner axle-abutting face or bore 15. In addition thereto, this invention provides a transverse port 16 extending through lining 13 from one of the grooves 14 to its outer face 17. This invention also provides the box 1 with a portway 18 extending from the transverse opening 16 in the lining 13 to the recess 7 in the plate 4. The lower end of portway 18 preferably enlarges into a recess 19, provided for the purpose of insuring free communication between the passages 16 and 18, and allowing latitude for any inaccuracies in the boring of the said passages which may prevent their proper registration. The holes 10 are preferably counterbored as at 20 to facilitate the flow of lubricant.

The mode of lubricating the face 11 will now be briefly described. Grease is forced against the lower side of the axle journal through the usual well-known screen by the usual spring pressure. When the axle begins to turn, the journal becomes hot, melting some of the grease and carrying it around up into the grooves 14. The grooves become filled and grease enters the portways 16 and 18 and pocket 7 in turn, which latter becomes filled and expels the lubricant through the portways 10 into the space between the face 11 and the lateral abutting face of the hub of the wheel. The pressure on the grease in the grooves 14 increases in the direction of rotation of the axle, and the most suitable pressure necessary for forcing the grease to the recess 7 may be selected by locating the passage 16 at a more or less advanced point in the lining 13 with respect to the direction in which the axle rotates. The most suitable location of the passage 16 for a road engine is preferably about forty-five degrees from the horizontal in the direction of rotation of the axle, any further advance in the location of the passage 16 producing ordinarily too great a pressure in the pockets 7 and producing too profuse a flow of lubricant from the ports 10. In a switch engine, whose axle rotates as often in one direction as in the other, it is preferable to provide two such passages 16, one for each direction of rotation of the axle. When the journal becomes hotter, the heat tends to expand the grease and increase the pressure, so that it is fed more rapidly to the face 11, and when the journal cools, the pressure is correspondingly reduced, so that less lubricant is supplied. Also, when the axle desists, no lubricant is expelled and wasted. Furthermore, the pockets 8 being adjacent to the surface 11, any friction thereat produces heat which increases the pressure in the pockets and expels the lubricant proportionately as needed. The proper lubrication of the face 11 as afforded by this invention also facilitates the elimination of sand and other abrading matter which inevitably enters between the face 11 and the adjacent hub of the driving wheel.

Having thus fully described this invention, I hereby reserve the benefit of all changes in form, arrangement, order, or use of parts, as it is evident that many minor changes may be made therein without departing from the spirit of this invention or the scope of the following claims.

I claim:

1. A bearing comprising a box having an oil passageway, a bearing plate member applied to the side face of said box, said plate member having its inner face provided with a circumferentially extending recess in communication with said passageway, said recess embodying enlarged pockets connected by relatively short constricted necks and said member having oil ducts communicating with said pockets and the outer face of said member.

2. A bearing comprising a box having an oil passageway, a bearing member having its inner face provided with a circumferentially extending recess in communication with said passageway, said recess embodying pockets gradually reducing in size to define constricted necks therebetween and said bearing member having oil ducts in direct communication with each of said pockets and the outer face of said member.

In testimony whereof I hereunto affix my signature.

SAMUEL W. CRAWFORD.